Patented Feb. 7, 1950

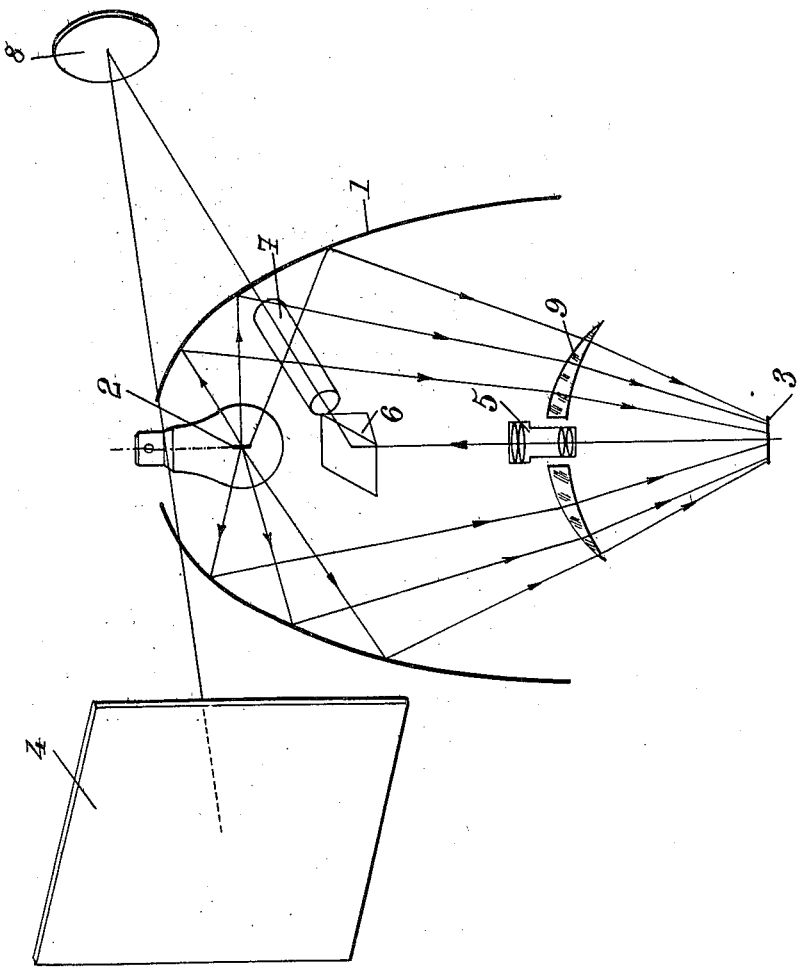

2,496,675

UNITED STATES PATENT OFFICE 2,496,675

OPTICAL PROJECTION APPARATUS WITH NORMAL ILLUMINATION MEANS

Henri Marcel Edmond Pasquet, Neuilly-sur-Seine, France, assignor to Societe d'Applications Generales D'Electricite & De Mecanique, Sagem, Paris, France, a society of France Application June 18, 1946, Serial No. 677,612
In France May 22, 1946

2 Claims. (Cl. 88—24)

The present invention relates to optical apparatus for the examination of an artificially illuminated object, either directly or by photography, and in particular after optical enlarging thereof, the invention being more especially, although not exclusively, concerned with apparatus of this type giving on a screen an enlarged projection of the image.

The chief object of my invention is to provide an apparatus of this type which is better adapted to meet the requirements of practice than those used for the same purpose up to the present time.

Preferred embodiments of my invention will be hereinafter described with reference to the accompanying drawings, given merely by way of example, and in which:

The only figure is a diagrammatical view of an enlarging apparatus made according to an embodiment of my invention.

This apparatus comprises on the one hand, means for concentrating the light flux from an illuminating source 2 on an observation area 3, of substantially flat shape, on which is disposed the object to be examined, and on the other hand, optical means for examination of this object, to wit, in this case, means for projecting this object on screen 4.

According to my invention, the observation area 3 being transverse, and preferably perpendicular, to the line that joins it to the light source 2, the light flux concentrating means essentially include a reflector I extending around said source and shaped to deflect the light rays emitted from said source transversely to said line into directions making small angles therewith, said directions preferably converging toward said area 3 so as further to increase the light concentration thereon.

Advantageously, as shown by the drawings, reflector I is given the shape of the portion of a quadric surface that laterally surrounds source 2, the latter being located in one of the focal regions of this surface while area 3 is located in the other focal region thereof and is advantageously perpendicular to the focal axis thereof.

Thus, the light flux reflected from the object to be examined in directions close to the normal to surface 3 is very intensive and can be usefully caught by the optical system serving to the formation on screen 4 of an enlarged image of this object.

It will be readily understood that such an apparatus permits of utilizing most of the flux emitted by illuminating source 2. Therefore it will be possible to make use of a source of relatively low brightness, that is to say producing heat radiations which do not risk deteriorating or deforming the object in question.

Furthermore, due to the fact that the light beam reflected from this object is substantially at right angles to the observation surface 3, accommodation of the receiving optical system to the points of said object that are most distant from one another will take place under much more favorable conditions than in the case of apparatus in which the reflected beam is oblique. In other words, the detrimental effects of distortion and the defect of sharpness of the marginal portions of the image will thus be reduced to a minimum.

Advantageously, the illuminating source 2 is constituted by a high gaseous pressure mercury vapor lamp, emitting light rays from a surface of cylindrical shape. One of the characteristic features of such a lamp is that it supplies practically no light rays in the axial direction of said cylindrical surface.

Advantageously, reflector I is constituted by a portion of an ellipsoid of revolution the eccentricity of which is the greater as it is desired to obtain an illuminating beam contained in a smaller solid angle. In some cases, reflector I may be given the shape of a paraboloid of revolution having its axis at right angles to surface 3.

In some cases, when it is desired to obtain an oblong illuminated area on surface 3, for instance when the objects to be examined are themselves of oblong shape, reflector I, instead of being in the shape of a body of revolution, will be given any suitable elongated shape in transverse section, i. e. in section by planes perpendicular to the axial line joining the central point of area 6 with the source of light. But in all cases, the sections of the surface of this reflector by planes passing through this axial line must be conical curves having their focus in the region of source 2.

Advantageously, the illuminating element of this source has an elongated shape and extends along said axial line. For instance, when, as above mentioned, the source is a mercury vapor lamp having an illuminating element of cylindrical shape, this element is coaxial with reflector I.

According to my invention, the optical means for receiving the light beam emitted from the object to be examined is disposed between source 2 and surface 3. The optical axis of said means is to coincide with the optical axis of reflector I.

In the example shown by the drawing, the optical means in question includes a magnifying objective system 5 and a prism or mirror 6 for deflecting the light rays, for instance through a tube 7 the walls of which are preferably blackened, onto a mirror 8 from which these rays are finally projected on screen 4.

In addition to these elements, the apparatus according to my invention preferably further includes means for subjecting the illuminating means to an anamorphosis and/or to a selective treatment for eliminating certain radiations.

For instance, as shown by the drawing, an annular lens 9, which surrounds objective system 5, concentrates the light beam from reflector 1 onto surface 3.

Suitable filters may be incorporated in the system to exert the desired selective action above referred to, for instance for stopping long wavelength rays which might produce heat radiation.

Of course, the anamorphosis and/or selective means are advantageously mounted in a removable or adjustable manner, so as to permit of examining pieces under different illuminating conditions.

As for screen 4 it is advantageously constituted by a plane surface, either opaque or translucent, eventually coated with a fluorescent product. But this does not exclude the possibility of employing curvilinear screens for the examination of objects having curved surfaces (balls, rods, wires, etc.).

It is to improve the sharpness of the image of an object, the surface of which is to be examined, that the object is located in a plurality of different planes by immersing said object in a liquid having a high index of refraction.

The apparatus according to the present invention has many advantages among which the following may be considered as particularly important:

It permits of obtaining images that are clearly visible even in daylight, without subjecting the object that is examined to the effect of dangerous calorific radiations.

The images that are obtained are uniformly illuminated, in particular owing to the location of the objective system in a neutral zone, that is to say in conditions such that no shadow is projected onto the zone of observation.

Sharpness also is practically uniform, even in the marginal zones and with objective systems of low accommodation power, owing to the fact that the reflected beam is substantially perpendicular to the plane of the object.

It is pointed out that the invention is not limited to enlarging apparatus and, in particular, that it could be applied to the case of stroboscopic devices.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus of the type described which comprises, in combination, means forming an observation area for an object, an illuminating source of elongated shape extending along a portion of an axis at least substantially at right angles to said area, the length of said source along said axis being of the same order of magnitude as the radius of said area, means for concentrating onto said area substantially all the light rays from said source with the exception of those making a very small angle with said axis, said means including a reflector coaxially surrounding said source and the axial sections of which are portions of ellipses having one focus on said source and the other one in the region of said area and magnifying means for examination of said object including an objective system located along said axis between said source and said area.

2. An apparatus according to claim 1 in which the illuminating source is a high gaseous pressure mercury vapor lamp the light emitting element of which is a cylinder located along said axis.

HENRI MARCEL EDMOND PASQUET.

REFERENCES CITED

The following references are of record in the file of this patent:

UNITED STATES PATENTS

| Number | Name | Date |
|---|---|---|
| 1,275,120 | Ballman et al. | Aug. 6, 1918 |
| 1,355,805 | Banfield | Oct. 19, 1920 |
| 1,430,494 | Correll | Sept. 26, 1922 |
| 1,594,936 | Frampton | Aug. 3, 1926 |
| 1,750,931 | Kellner et al. | Mar. 18, 1930 |
| 1,842,855 | Benard | Jan. 26, 1932 |
| 1,853,689 | Lihotzky | Apr. 12, 1932 |
| 1,996,920 | Hauser | Apr. 9, 1935 |
| 2,155,243 | Adams et al. | Apr. 18, 1939 |
| 2,187,071 | Bergmans | Jan. 16, 1940 |
| 2,195,392 | Van Alphen | Mar. 26, 1940 |
| 2,409,328 | Wilder | Oct. 15, 1946 |